United States Patent
Cao et al.

(10) Patent No.: US 12,480,804 B2
(45) Date of Patent: Nov. 25, 2025

(54) HANGING SCALE SENSOR APPARATUS AND A HANGING SCALE

(71) Applicants: Mettler-Toledo (Changzhou) Measurement Technology Ltd., Changzhou (CN); Mettler-Toledo (Changzhou) Precision Instruments Ltd., Changzhou (CN); Mettler-Toledo International Trading (Shanghai) Co., Ltd., Shanghai (CN)

(72) Inventors: Naiqing Cao, Changzhou (CN); Edgar Kempf, Inzigkofen (DE); Dieter Kontschak, Winterlingen (DE)

(73) Assignees: Mettler-Toledo (Changzhou) Measurement Technology Ltd., Changzhou (CN); Mettler-Toledo (Changzhou) Precision Instruments Ltd., Changzhou (CN); Mettler-Toledo International Trading (Shanghai) Co., Ltd., Shanghai (CN)

( * ) Notice: Subject to any disclaimer, the term of this patent is extended or adjusted under 35 U.S.C. 154(b) by 308 days.

(21) Appl. No.: 18/252,721

(22) PCT Filed: Nov. 15, 2021

(86) PCT No.: PCT/CN2021/130658
§ 371 (c)(1),
(2) Date: May 12, 2023

(87) PCT Pub. No.: WO2022/105712
PCT Pub. Date: May 27, 2022

(65) Prior Publication Data
US 2024/0019294 A1    Jan. 18, 2024

(30) Foreign Application Priority Data
Nov. 17, 2020  (CN) .......................... 202011288629.2

(51) Int. Cl.
G01G 19/14    (2006.01)
G01G 21/22    (2006.01)
G01G 23/00    (2006.01)

(52) U.S. Cl.
CPC ............. *G01G 19/14* (2013.01); *G01G 21/22* (2013.01); *G01G 23/005* (2013.01)

(58) Field of Classification Search
USPC ......................................................... 177/244
See application file for complete search history.

(56) References Cited

U.S. PATENT DOCUMENTS 4,696,359 A * 9/1987 Glibbery .............. G01G 23/163
73/862.622
4,800,973 A * 1/1989 Angel .................... G01G 19/44
177/210 C (Continued)

FOREIGN PATENT DOCUMENTS

CN    101672688 A    3/2010
CN    204373748 U    6/2015

(Continued)

*Primary Examiner* — Jacques M Saint Surin
(74) *Attorney, Agent, or Firm* — Standley Law Group LLP; Jeffrey S. Standley; Adam J. Smith

(57) ABSTRACT

A hanging scale sensor apparatus and hanging scale are disclosed. The hanging scale sensor apparatus includes an adapter beam connected to one end of a bottom face of a weighing sensor with a support base is connected to the other end of the bottom face of the weighing sensor. The adapter beam and a support base are positioned directly below the weighing sensor; and a scale pan suspension structure is connected to the adapter beam for positioning the hanging scale sensor apparatus.

10 Claims, 6 Drawing Sheets

(56) References Cited

U.S. PATENT DOCUMENTS

| | | | | |
|---|---|---|---|---|
| 4,936,399 | A | * | 6/1990 | Christman ............ G01G 19/18 |
| | | | | 177/148 |
| 5,000,274 | A | * | 3/1991 | Bullivant ............ G07G 1/0054 |
| | | | | 177/128 |
| 8,539,691 | B2 | * | 9/2013 | Daniel ................ F16M 11/105 |
| | | | | 33/645 |
| 9,400,205 | B2 | * | 7/2016 | Geldman ............... G01G 19/18 |
| 10,539,453 | B2 | * | 1/2020 | Hauck .................... G01G 21/23 |
| 2008/0087475 | A1 | * | 4/2008 | Petrucelli ........... G01G 23/3728 |
| | | | | 177/201 |

FOREIGN PATENT DOCUMENTS

| | | |
|---|---|---|
| CN | 204495457 U | 7/2015 |
| CN | 206740236 U | 12/2017 |
| CN | 207556660 U | 6/2018 |
| CN | 213779233 U | 7/2021 |
| DE | 10161517 A1 | 7/2003 |
| KR | 10-2006-0057674 A | 5/2006 |

* cited by examiner

HANGING SCALE SENSOR APPARATUS AND A HANGING SCALE

BACKGROUND OF THE INVENTION

Technical Field

The present invention relates to the field of sensors, and in particular to a hanging scale sensor apparatus and a hanging scale.

Background Art

In the prior art, hanging scales, also referred to as hanging hook scales, hanging weighing scales, suspension scales, hook scales, etc., are measuring instruments that measure the mass (weight) of an object in a suspended state.

Generally, a hanging scale mainly comprises a hanging member, a scale body, a loading apparatus, a housing, and a connecting member. The scale body further comprises a weighing sensor, an electronic circuit, a printer, a mounting frame, etc. The hanging scale further includes a display instrument and an operation panel. That are mounted on the housing. The hanging member is connected to the scale body. The loading apparatus is connected to the scale body via the connecting member. The operation panel is provided with keys for selecting different prices, commodity names, etc. By selecting different commodity name keys, a weighing result can be displayed on a display screen, and the printer can be used to print all the details including commodity names, weight and price of the commodity, so that the weighing process is very convenient for the user.

However, existing hanging scales have a fixed internal structure that cannot be flexibly adjusted, and the position of the sensor mounted therein is limited. If the sensor is mounted on the outer side of the scale body, an additional external cover is needed to cover the sensor, resulting in a complicated protective structure.

In particular, for a super-thin scale body structure, existing hanging scale sensors are not suitable.

In view of this, those skilled in the art have developed a hanging scale sensor apparatus and a hanging scale.

SUMMARY

The technical problem to be solved by the present invention is to provide a hanging scale sensor apparatus and a hanging scale, to overcome the defects such as the limited mounting position and the complicated protective structure in the prior art hanging scale sensor.

The present invention solves the above technical problems by providing a hanging scale sensor apparatus, comprising a weighing sensor, an adapter beam, a support base and a scale pan suspension structure. The adapter beam is connected to one end of a bottom face of the weighing sensor, and the support base is connected to the other end of the bottom face of the weighing sensor, such that the adapter beam and the support base are positioned directly below the weighing sensor. The scale pan suspension structure is connected to the adapter beam for positioning the hanging scale sensor apparatus.

According to an embodiment of the present invention, the adapter beam and the support base are connected via a limiting structure.

According to an embodiment of the present invention, the limiting structure comprises: an outwardly-extending protrusion that is provided at an end portion of the adapter beam, closer to the support base. A groove is provided at an end portion of the support base, closer to the adapter beam. The outwardly-extending protrusion is mounted in the groove; or a groove that is provided at an end portion of the adapter beam, closer to the support base An outwardly-extended protrusion is provided at an end portion of the support base, closer to the adapter beam The outwardly-extending protrusion is mounted in the groove.

According to an embodiment of the present invention, there is a spacing provided between upper and lower faces of the outwardly-extending protrusion and the groove.

According to an embodiment of the present invention, a width of the adapter beam is smaller than or equal to that of the weighing sensor, and a width of the support base is greater than that of the weighing sensor.

The present invention further provides a hanging scale, comprising a scale body and the hanging scale sensor apparatus as mentioned above, wherein a mounting groove is provided at the bottom of the scale body, and the scale pan suspension structure passes through the mounting groove, such that the hanging scale sensor apparatus is located within the scale body.

According to an embodiment of the present invention, the support base is fixedly connected to an inner wall face of the scale body.

According to an embodiment of the present invention, a plurality of protective limiting members are provided between the adapter beam and the inner wall face of the scale body for supporting and limiting the adapter beam in two directions.

According to an embodiment of the present invention, the protective limiting members are limiting screws, limiting blocks, limiting slots or limiting pins.

According to an embodiment of the present invention, the hanging scale sensor apparatus meets the following relationship: $L > L1 + h$, wherein L represents a thickness of the scale body, L1 represents a thickness of the support base, and h represents a wall thickness of the scale body.

The positive improvement effects of the present invention are as follows: the hanging scale sensor apparatus and the hanging scale of the present invention may be assembled separately, may be placed inside a scale body, according to requirements, and may further adjust the internal space of the scale body. The hanging scale sensor apparatus has an adjustable installation position, and the sensor apparatus can realize two-way limitations, prevent overloading, and occupy small installation space. The hanging scale sensor apparatus has a small overall size and thus, has little influence on the structural layout of the scale body, and is suitable for the design of a super-thin scale body structure.

BRIEF DESCRIPTION OF THE DRAWINGS

With reference to the accompanying drawings, embodiments of the present invention will be described hereinafter. In the drawings.

DETAILED DESCRIPTION OF EMBODIMENTS

Figure 1:
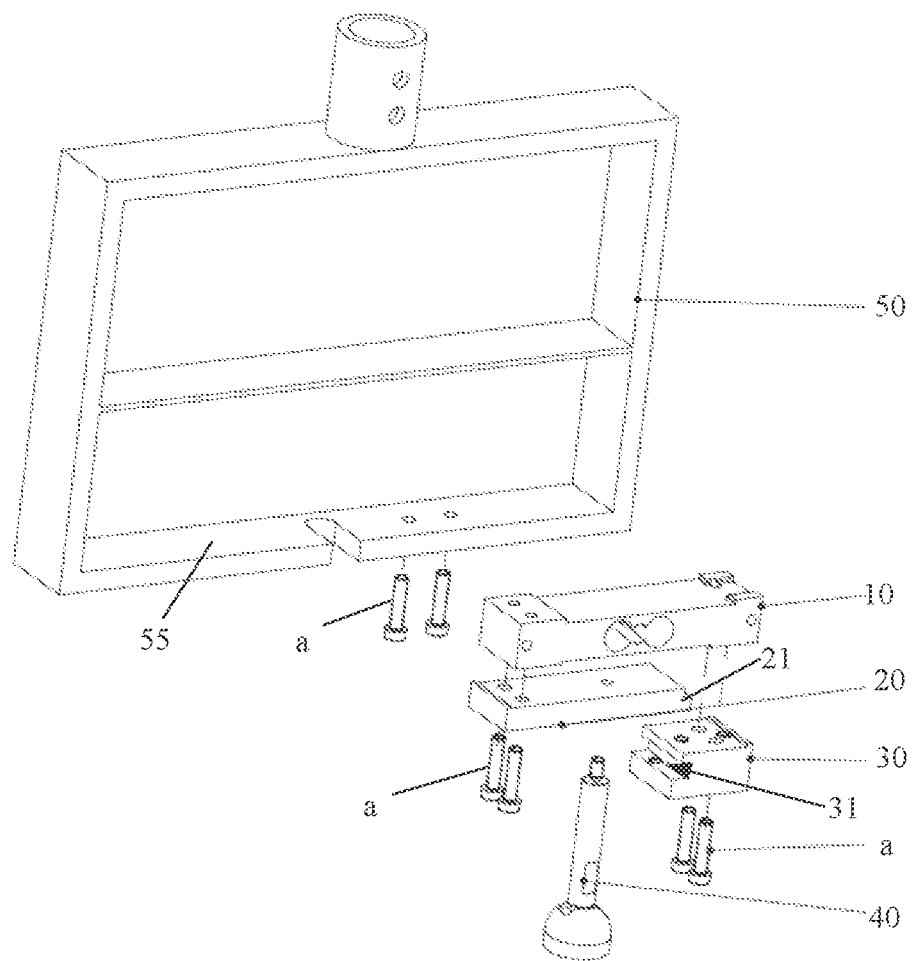
FIG. 1 is a schematic exploded diagram of a hanging scale sensor apparatus and a hanging scale of the present invention.

To make the above objects, features and advantages of the present invention more apparent and easier to understand, particular embodiments of the present invention are described in detail below with reference to the accompanying drawings.

Embodiments of the present invention will now be described in detail with reference to the accompanying drawings. Reference will now be made in detail to preferred embodiments of the present invention, examples of which are illustrated in the accompanying drawings. The same reference numerals used in all the accompanying drawings denote identical or similar parts wherever possible.

Furthermore, although the terms used in the present invention are selected from well-known common terms, some of the terms mentioned in the description of the present invention may have been selected by the applicant according to his or her determination, and the detailed meaning thereof is described in the relevant section described herein.

Furthermore, the present invention must be understood, not simply by the actual terms used but also by the meanings encompassed by each term.

Figure 2:
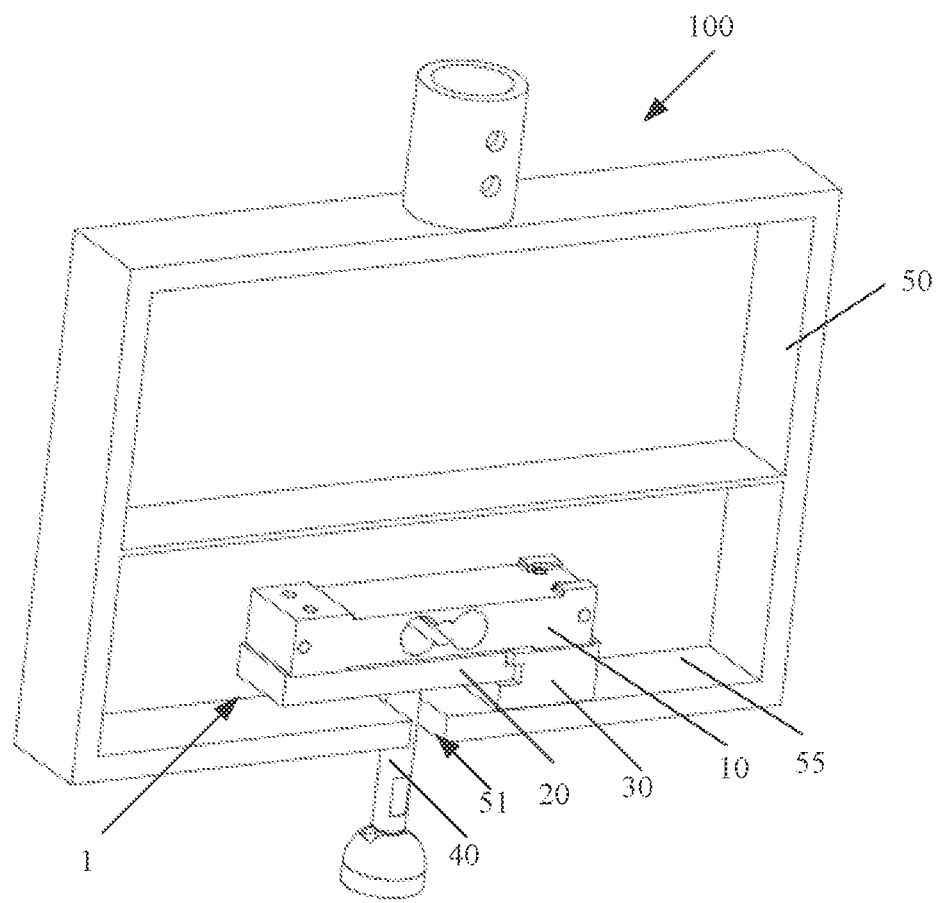
FIG. 2 is a first perspective view of the hanging scale of the present invention.
Figure 3:
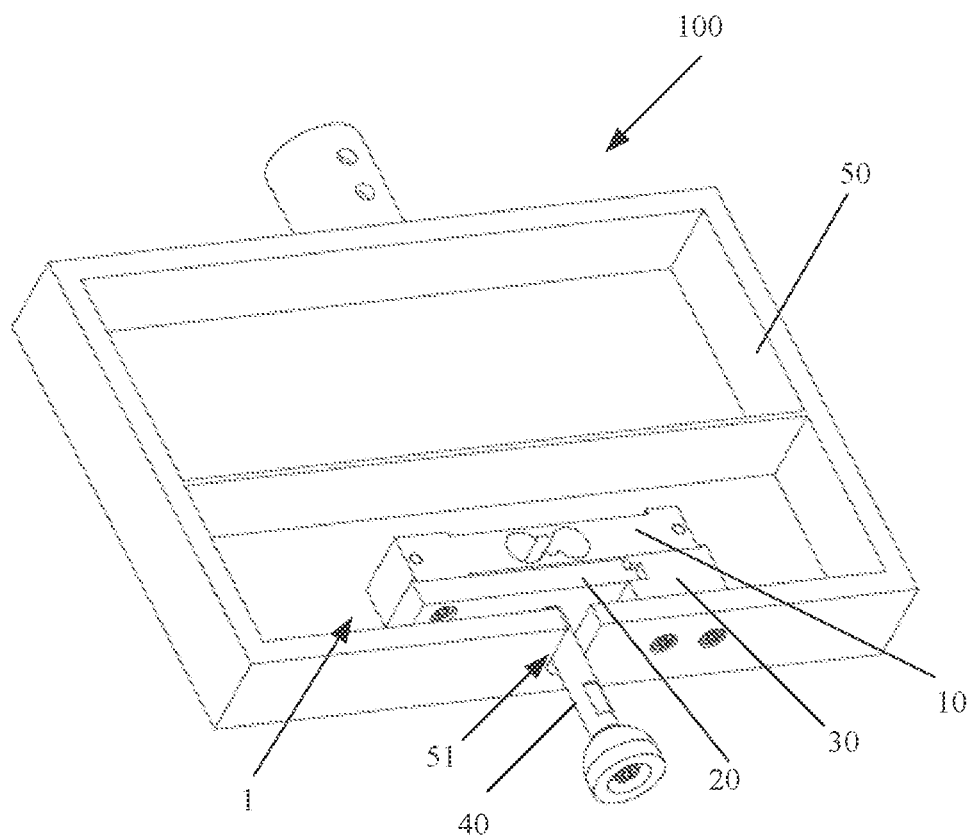
FIG. 3 is a second perspective view of the hanging scale of the present invention.
Figure 4:
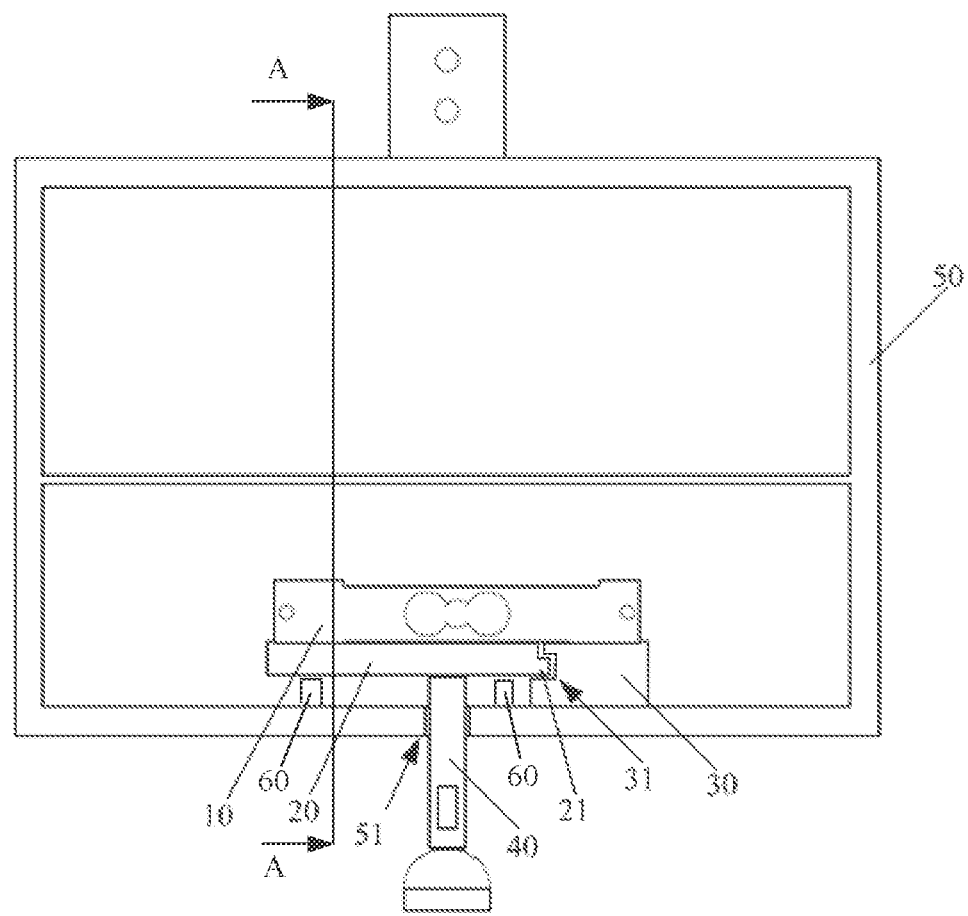
FIG. 4 is a first front view of the hanging scale of the present invention.
Figure 5:
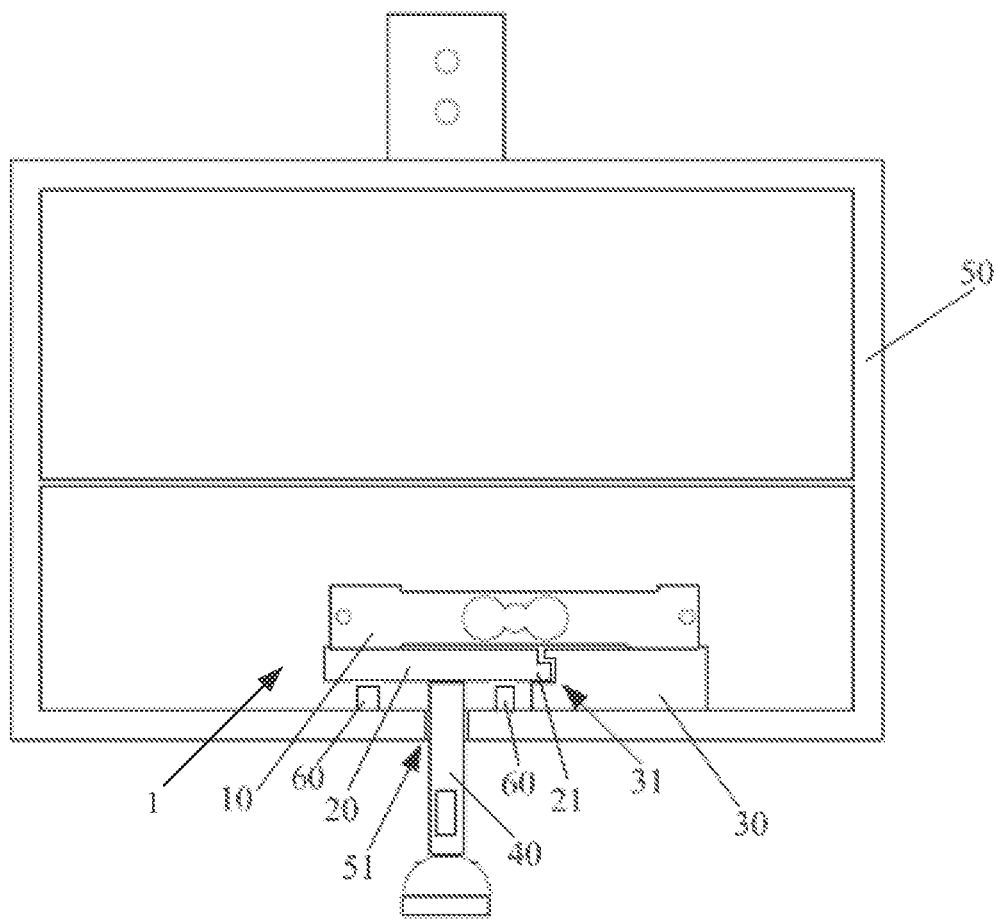
FIG. 5 is a second front view of the hanging scale of the present invention.
Figure 6:
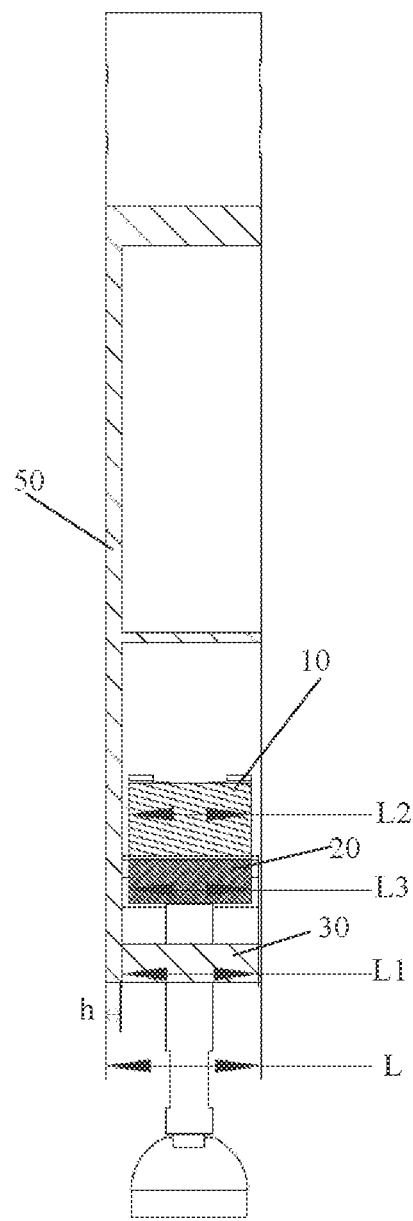
FIG. 6 is a sectional view taken along a line A-A in FIG. 4.

FIG. 1 is a schematic exploded diagram of a hanging scale sensor apparatus and a hanging scale of the present invention. FIG. 2 is a first perspective view of the hanging scale of the present invention. FIG. 3 is a second perspective view of the hanging scale of the present invention. FIG. 4 is a first front view of the hanging scale of the present invention. FIG. 5 is a second front view of the hanging scale of the present invention. FIG. 6 is a sectional view taken along a line A-A in FIG. 4.

As shown in FIGS. 1 to 6, the present invention discloses a hanging scale sensor apparatus 1, which comprises a weighing sensor 10, an adapter beam 20, a support base 30 and a scale pan suspension structure 40. The adapter beam 20 is connected to one end of a bottom face of the weighing sensor 10. The support base 30 is connected to the other end of the bottom face of the weighing sensor 10. The adapter beam 20 and the support base 30 are positioned directly below the weighing sensor 10. The scale pan suspension structure 40 is connected to the adapter beam 20 for positioning the hanging scale sensor apparatus 1.

A fixing bolt is used to fix the adapter beam 20 and the support base 30 to the weighing sensor 10. Of course, this is just an example, and other fixing member structures may also be used.

Preferably, the adapter beam 20 and the support base 30 are connected via a limiting structure. For example, in this embodiment, the limiting structure comprises: an outwardly-extending protrusion 21 that is provided at an end portion of the adapter beam 20, closer to the support base 30. A groove 31 is provided at an end portion of the support base 30, closer to the adapter beam 20. The outwardly-extended protrusion 21 is mounted in the groove 31. There is a spacing provided between upper and lower faces of the outwardly-extended protrusion 21 and the groove 31 to protect the weighing sensor 10 from being subjected to an upward or downward force during installation and transportation.

Alternatively, the limiting structure is envisaged as comprising a groove 31 that is provided at an end portion of the adapter beam 20, closer to the support base 30, and an outwardly-extended protrusion 21 that is provided at an end portion of the support base 30 closer to the adapter beam 20. The outwardly-extended protrusion 21 is mounted in the groove 31.

In the foregoing structures, a two-way limiting protection is formed between the adapter beam 20 and the support base 30 by means of the outwardly-extended protrusion 21 and the groove 31. The upper and lower limiting faces of the groove 31 may respectively protect the weighing sensor 10 from being subjected to an excessive upward pressing force and downward pull force.

The adapter beam 20 may be adjusted according to the installation position, in terms of the length of the beam and the position of a hanging arm, which may be implemented by adjusting the thickness/material, etc. Such a structure may match sensors of different ranges and match the tolerance of the limiting size.

In addition, the size of the support base 30 may be adjusted according to the screw size, the strength, the cost, etc.

Further, a width L3 of the adapter beam 20 is smaller than or equal to a width L2 of the weighing sensor 10, and a width L1 of the support base 30 is greater than the width L2 of the weighing sensor 10.

The present invention also provides a hanging scale 100, which comprises a scale body 50 and the hanging scale sensor apparatus 1 as mentioned above. A mounting groove 51 is provided at a bottom of the scale body 50, and a scale pan suspension structure 40 passes through the mounting groove 51, such that the hanging scale sensor apparatus 1 is located within the scale body 50.

Preferably, the support base 30 is fixedly connected to an inner wall face 55 of the scale body 50.

Still further, a plurality of protective limiting members 60 are provided between the adapter beam 20 and the inner wall face 55 of the scale body 50. There is a spacing provided between the protective limiting members 60 and the adapter beam 20. Deformation is allowed to occur during weighing and the adapter beam 20 is supported and limited in two directions (being subjected to a downward or upward force). Here, the protective limiting members 60 are preferably limiting screws.

According to the above structural description, as shown in FIG. 6, the hanging scale sensor apparatus 1 meets the following relationship: $L>L1+h$, where L represents a thickness of the scale body 50, L1 represents a thickness of the support base 30, and h represents a wall thickness of the scale body 50.

When the widths of the support base and the adapter beam for sensor installation meet the above characteristics, it is possible to realize the design of a super-thin scale body.

As shown in FIGS. 4 and 5, In the hanging scale sensor apparatus 1 and the hanging scale 100 of the present invention it is possible to adjust the sizes of the adapter beam 20 and the support base 30 so as to adjust the position of a sensor mounting area according to the layout requirements, without changing the design and position of a load-bearing hanging arm. The vacant area may be flexibly allocated to other functional modules.

In conclusion, the hanging scale sensor apparatus 1 of the present invention may be assembled separately, may be placed inside a scale body according to requirements, and may further adjust the internal space of the scale body. The hanging scale sensor apparatus 1 has an adjustable installation position, and the sensor apparatus can realize two-way limitations, prevent overloading, and occupy small installation space. The hanging scale sensor apparatus 1 has a small overall size and thus, has little influence on the structure of the scale body, and is suitable for the design of a super-thin scale body structure.

Although specific implementations of the present invention have been described above, those skilled in the art should understand that these are merely examples, and the scope of protection of the present invention is defined by the appended claims. Various alterations or modifications to these implementations can be made by those skilled in the art without departing from the principle and essence of the present invention. However, these alterations and modifications all fall within the scope of protection of the present invention.

| Reference signs list | |
|---|---|
| Hanging scale | 100 |
| Hanging scale sensor apparatus | 1 |
| Weighing sensor | 10 |
| Adapter beam | 20 |
| Support base | 30 |
| Scale pan suspension structure | 40 |
| Protrusion | 21 |
| Groove | 31 |
| Scale body | 50 |
| Mounting groove | 51 |
| Inner wall face | 55 |
| Protective limiting member | 60 |
| Width of the support base | L1 |
| Width of the weighing sensor | L2 |
| Width of the adapter beam | L3 |
| Thickness of the scale body | L |
| Thickness of the support base | L1 |
| Wall thickness of the scale body | h |
| Fixing bolt | a |

The invention claimed is:

1. A hanging scale sensor apparatus, comprising:
a weighing sensor;
an adapter beam;
a support base; and
a scale pan suspension structure;
wherein the adapter beam is connected to one end of a bottom face of the weighing sensor, and the support base is connected to another end of the bottom face of the weighing sensor, such that the adapter beam and the support base are positioned directly below the weighing sensor, and the scale pan suspension structure is connected to the adapter beam for positioning the hanging scale sensor apparatus;
wherein the adapter beam and the support base are connected via a limiting structure, the limiting structure comprising:
an outwardly-extending protrusion that is provided at an end portion of the adapter beam, closer to the support base, and a groove is provided at an end portion of the support base, closer to the adapter beam, and the outwardly-extending protrusion is mounted in the groove; or
a groove that is provided at an end portion of the adapter beam, closer to the support base, an outwardly-extending protrusion is provided at an end portion of the support base, closer to the adapter beam, and the outwardly-extending protrusion is mounted in the groove.

2. The hanging scale sensor apparatus of claim 1, wherein a spacing is provided between upper and lower faces of the outwardly-extending protrusion and the groove.

3. The hanging scale sensor apparatus of claim 1, wherein a width of the adapter beam is smaller than or equal to a width of the weighing sensor, and a width of the support base is greater than the width of the weighing sensor.

4. A hanging scale comprising:
a scale body; and
a hanging scale sensor apparatus comprising:
a weighing sensor;
an adapter beam;
a support base; and
a scale pan suspension structure;
wherein the adapter beam is connected to one end of a bottom face of the weighing sensor, and the support base is connected to another end of the bottom face of the weighing sensor, such that the adapter beam and the support base are positioned directly below the weighing sensor, and the scale pan suspension structure is connected to the adapter beam for positioning the hanging scale sensor apparatus;
wherein a mounting groove is provided at a bottom of the scale body, and the scale pan suspension structure passes through the mounting groove, such that the hanging scale sensor apparatus is located within the scale body;
wherein the adapter beam and the support base are connected via a limiting structure, said limiting structure comprising:
an outwardly-extending protrusion that is provided at an end portion of the adapter beam, closer to the support base, and a groove is provided at an end portion of the support base, closer to the adapter beam, and the outwardly-extending protrusion is mounted in the groove; or
a groove that is provided at an end portion of the adapter beam, closer to the support base, an outwardly-extending protrusion is provided at an end portion of the support base, closer to the adapter beam, and the outwardly-extending protrusion is mounted in the groove.

5. The hanging scale of claim 4, wherein the support base is fixedly connected to an inner wall face of the scale body.

6. The hanging scale of claim 5, wherein a plurality of protective limiting members are provided between the adapter beam and the inner wall face of the scale body for supporting and limiting the adapter beam in two directions.

7. The hanging scale of claim 6, wherein the protective limiting members are limiting screws, limiting blocks, limiting slots or limiting pins.

8. The hanging scale of claim 4, wherein the hanging scale sensor apparatus meets the following relationship: $L > L1 + h$, wherein L represents a thickness of the scale body, L1 represents a thickness of the support base, and h represents a wall thickness of the scale body.

9. The hanging scale of claim 4, wherein a spacing is provided between upper and lower faces of the outwardly-extending protrusion and the groove.

10. The hanging scale of claim 4, wherein a width of the adapter beam is smaller than or equal to a width of the weighing sensor, and a width of the support base is greater than the width of the weighing sensor.

* * * * *